Patented Sept. 29, 1953

2,653,886

UNITED STATES PATENT OFFICE 2,653,886

PROCESS FOR TREATING FIBROUS MATERIALS TO IMPROVE THEIR BONDS WITH RUBBER

Alexander Henderson Gentle and Thomas Jackson, Spondon, near Derby, England, assignors to British Celanese Limited, a corporation of Great Britain No Drawing. Application June 27, 1950, Serial No. 170,702. In Great Britain June 30, 1949

18 Claims. (Cl. 154—52)

This invention relates to improvements in processing textile and other fibrous materials and especially to a process for facilitating the adhesion of high tenacity regenerated cellulose and other textile fibres to rubber. The term "fibre" is used in this specification to include continuous filaments as well as staple fibres and the fibres of such materials as wood and paper.

For many purposes it is desired to bond rubber to cellulose or high-tenacity regenerated cellulose, for example, in making pneumatic tyres, conveyor belts, driving belts, and printers' blankets. Owing, doubtless, to the high intermolecular cohesion of cellulose and the relative chemical inertness and non-polar character of rubber, there is little or no specific adhesion between the two, and effective bonding depends largely on mechanical anchorage of the rubber to the cotton, which is much facilitated by the rough surface of a cotton yarn. To improve the adhesion it has long been customary with some tyre manufacturers to give cotton tyre cords a so-called "gum-dip" before bonding them to the rubber. This involves dipping the cords in a solution of a somewhat degraded rubber (i. e. a rubber the molecular weight of which has been reduced by prolonged milling) and evaporating off the solvent. With the advent of continuous-filament high tenacity regenerated cellulose tyre cords, the yarns of which lack the roughness of cotton yarns, it was found that although good adhesion to rubber could be obtained by providing a gum-dip, the omission of such a treatment led to poor adhesion. A similar difficulty was found in bonding rubber to fabrics of such high tenacity material, for example, in the manufacture of belting. For the benefit of those rubber-proofers and tyre-manufacturers whose process did not include a gum-dip, manufacturers of high tenacity regenerated cellulose cords and fabrics sought a treatment for those textiles which would enable them subsequently to be bonded to rubber without a gum-dip. A process that was found satisfactory in many respects was that of U. K. Patent 477,330.

U. K. Patent No. 477,380 describes and claims pre-treating rubber, or material to which it is to be joined, with an adhesive comprising an aqueous solution or dispersion of heat-hardening resin-forming substances, for example, phenolic compounds and aldehydes which are water-soluble to the extent of 0.5–5% by weight, drying the adhesive and converting the resin-forming substances into infusible, insoluble resins before union, or while effecting union, between the rubber and the other material.

The process of the patent as specifically described involves (as is standard practice in making heat-hardened phenol-aldehyde synthetic resins) the use of an alkaline catalyst in condensing the phenol with the aldehyde, and of a molar proportion of aldehyde to phenol of more than 2:1. The aldehyde also must be one which (like formaldehyde) is capable, if present in the molar excess specified, of forming a cross-linked polymer; or a suitable source of formaldehyde must be present in addition. In what is evidently the preferred method of the patent for treating regenerated cellulose cords or fabric, rubber latex is applied conjointly with the aqueous solution of the heat-hardened resin. The patent states that comparable results cannot be obtained by the application of solutions of the same materials in organic solvents. The preferred method referred to, which comprises applying to the regenerated cellulose a mixture of rubber latex with an aqueous solution of a heat-hardening condensation product formed by alkaline condensation of formaldehyde with resorcinol in a molar ratio greater than 2:1, and converting the condensation product to an insoluble, infusible, resin during vulcanisation of the rubber, has been largely used in bonding high tenacity regenerated tyre cords to rubber, and has hitherto been considered the best method of achieving this result without recourse to a gum-dip.

We have now found that even better results can be obtained by treating the regenerated cellulose with a solution of a permanently fusible synthetic resin which is a condensation product of a phenol with an aldehyde containing at least two carbon atoms. After drying the condensation product on the material very strong adhesion is obtained when a suitable rubber composition is applied to the treated material and vulcanised. Preferably the synthetic resin is insoluble in water but soluble in ethanol and is applied in solution in ethanol. Instead of ethanol other volatile neutral organic liquids that are completely miscible with water can be used. ("Volatile" in this specification means boiling below 102° C.) Such liquids include acetone, tetramethylene oxide, dioxane, and especially methanol and isopropanol.

We have also found that the treatment described can be applied with advantage to many kinds of fibrous material other than high-tenacity regenerated cellulose, when strong bonds are required between these materials and rubber. Such materials include wood, paper and textile materials containing fibres of cellulose, e. g. cotton, linen, ramie and jute, regenerated cellulose, thermoplastic cellulose derivatives such as cellulose acetate, cellulose propionate, cellulose acetate-propionate, cellulose acetate-butyrate and ethyl cellulose, polymers (including co-polymers) of acrylonitrile, co-polymers of vinyl acetate, polyamides such as nylon, polyesters such as polyethylene terephthalate, and poly-4-amino-1.2.4.-triazole. All these are materials the molecules of which comprise repeating units containing carbon, hydrogen, and an element which, according to Pauling is more electronegative than carbon (see L. Pauling "The Nature of the Chemical Bond," 1940, p. 64, Table 11-3). The process of the invention is applicable broadly to such fibrous materials of this constitution as can undergo the treatment, and the subsequent vulcanisation of the rubber, without damage. To fulfill this condition the fibrous material must, of course, be resistant to at least one neutral, volatile organic water-miscible liquid which is a solvent for the synthetic resin and must be capable of withstanding the vulcanisation temperature without decomposition or undue softening. From the point of view of resisting vulcanising temperatures the material should preferably be capable of being heated to 130° C. without melting or decomposition.

The present invention therefore contemplates a process for treating fibrous materials the molecules of which comprise repeating units containing carbon, hydrogen, and a more electronegative element than carbon, to facilitate the subsequent formation of strong bonds with rubber during vulcanisation of the rubber, which comprises impregnating the material with a permanently fusible synthetic resin in solution in an organic liquid that is completely miscible with water, and drying the material, the synthetic resin being a product obtainable by condensing an aldehyde containing at least 2 carbon atoms with a phenol, and the said solution being free from any source of formaldehyde.

Preferably the synthetic resin is water-insoluble but soluble in ethanol, and is applied in solution in a volatile, neutral organic liquid that is completely miscible with water. Excellent results have been obtained with an ethanol solution of a resin made by condensing acetaldehyde (applied in the form of paracetaldehyde) with common phenol in the presence of an acid catalyst the initial molar ratio of CH₃CHO:phenol ranging from 6:7 to 1:1. Impregnation with such a solution has given products which, unlike those obtained when a phenol/formaldehyde resin is used, are but lightly coloured. This is of advantage in some applications of the process of the invention. Furfural may be used in place of acetaldehyde and strong bonding to rubber can be obtained, for instance with a resin made from furfural and resorcinol in molar proportions of 0.5:1 to 1:1. The colour of the impregnated fabric, however, is apt to be very dark and with furfural a slight excess over equimolar proportions in the condensation leads to thermosetting, whereas with acetaldehyde excess of the aldehyde does not have this affect. Other aldehydes that can be used, but with less advantages, include butyr-aldehyde and acrolein. Instead of common phenol, resorcinol, meta-cresol, 1:3:5-xylenol, or phloroglucinol can be used. The phenol must have at least two, and preferably three, nuclear reactive hydrogen atoms, i. e. hydrogen atoms in ortho- or para-relationship to a phenolic group. The presence of one or two methyl groups in meta relationship to the phenolic group and even more so the presence of two or three phenolic groups in meta relationship, appears to be of advantage in facilitating the condensation.

In making the synthetic resin molar proportions of aldehyde to phenol ranging from 6:7 to 1:1 are generally suitable irrespective of the particular aldehyde and phenol selected. Lower molar proportions of aldehyde, e. g. from 0.5:1 to 6:7, can be used but the preparation of the resin is then less economical on account of the unreacted phenol. Higher molar proportions than about 1:1 with some aldehydes (e. g. with furfural, as mentioned above) lead to thermosetting properties in the resin. The condensation is preferably catalysed by acid. In general 0.5 to 1% of concentrated (35%) hydrochloric acid based on the weight of phenol is suitable. Weaker acids may be used in higher proportions. Alkaline catalysts are preferably avoided as being more likely to bring about undesirable side-reactions. In the absence of a catalyst the formation of the resin is generally very slow.

The permanently fusible resins applied according to the invention are thought to be linear polymers free from alcoholic groups and having a constitution represented by the following formula:

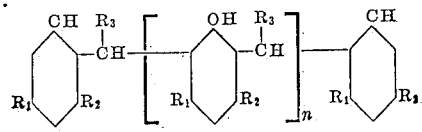

where R₁ and R₂ are hydrogen atoms or methyl or hydroxy groups, and R₃ is methyl, furfuryl or other group characteristic of the particular aldehyde used. The permanently fusible character of these polymers is probably connected with the absence of alcoholic, and especially methylol groups. It is thought that the high adhesion obtained by the process of the invention is bound up with the fact that the resins, are incapable of self-cross-linkage.

The amount of resin left on the fabric as a result of the impregnation need be no more than 0.5% of the weight of the fabric and is preferably not more than 2% of that weight. Such small increases in weight do not result in marked stiffening of the fabric and do not result in undesirable decrease in fatigue resistance of the yarns. These are important advantages of the process of the invention. Another great advantage is that excellent adhesion is obtained without the presence of rubber in the impregnating liquid. The use of impregnating liquids containing rubber may lead to certain difficulties, including sticking of the material to machine parts and unevenness in impregnation.

The products of the invention include rubberised fabrics and rubber-fabric laminates in which the fabric is impregnated with 0.5–2% of its weight of a synthetic resin which is a condensation product of phenol and an aldehyde containing at least 2 carbon atoms in substantially equimolar proportions, and in which the rubber has been applied with vulcanising ingredients after the resin and has been vulcanised by heating.

The process of the invention is of particular advantage in bonding rubber to regenerated cellulose material composed of continuous-filament yarn of tenacity at least 2.5 gms. per denier, especially yarn obtained by stretching cellulose acetate yarn in wet-steam to a tenacity of about 6 gms. per denier and subsequently saponifying the cellulose acetate under such conditions that shrinkage can occur. Such materials may have a tenacity above 6 gms. per denier. Products of somewhat lower tenacity and greater extension can be obtained by shrinking the stretched cellulose acetate yarn, for example, in a methylene chloride benzene mixture before saponification. A further method of making high tenacity regenerated cellulose materials is to wet-spin cellulose acetate in such a way that it is highly stretched during spinning and then to saponify. Instead of stretching in wet-steam or during wet-spinning, stretching may be effected in hot water or in an organic stretch-assisting agent, for example, in aqueous dioxane. Other methods capable of giving high tenacity products, but generally of inferior quality to those obtained by the methods referred to above include stretching the cellulose acetate in dry-steam or when heated in a dry condition by radiant heat. High tenacity regenerated cellulose materials are also obtainable by wet-spinning cellulose solutions, for example, viscose or cuprammonium cellulose with high stretch. These materials usually are of lower tenacity and behave somewhat differently from materials obtained by saponification of high tenacity cellulose acetate filaments, but the process of the invention is of advantage in bonding them to rubber and gives improved adhesion compared with the prior process referred to. The tenacity of the regenerated cellulose fibre may range from 2 gms. per denier up to 6 or more gms. per denier.

The process of the invention can also be used in bonding natural fibres, for example, cotton, linen and silk, to rubber. The invention also includes the application of the resin treatment to other synthetic fibres to improve their adhesion to rubber, for example, fibres comprising linear condensation polymers, including polyhexamethylene-adipamide, polyaminotriazole, and polyethylene terephthalate. The process of the invention is also useful in improving the adhesion to rubber of addition polymers containing polar groups, for example, polyacrylonitrile and co-polymers containing acrylonitrile and/or vinylidene chloride, for example, co-polymers of acrylonitrile with methacrylonitrile or with vinyl chloride, or of vinylidene chloride with vinyl chloride.

The form in which the textile material is treated will depend on the use to which the product is to be put. Thus, for example, for the construction of pneumatic tyres, tyrecords formed by doubling heavy denier continuous filaments of high tenacity regenerated cellulose, or cords of cotton, can be treated in the form of a weftless warp or in the form of a tyre fabric. For belting, heavy canvas fabrics of the high tenacity regenerated cellulose or of cotton are used. For printers' blankets a light-weight fabric which may be plainwoven but is preferably of a satin weave is used.

The process of the invention is of particular utility in bondtextile materials to natural rubber. The process may also be applied, however, in bonding such materials to synthetic rubbers, for example co-polymers of butadiene with a minor proportion of styrene such as GR–S, co-polymers of butadiene with a minor proportion of acrylonitrile, whether of the highly oil-resistant type e. g., "Hycar OR–15" (registered trade-mark) or of the less highly oil-resistant type e. g. "Hycar OR–25" and "Perbunan" (both registered trade-marks), co-polymers of butadiene or isoprene with isobutylene, and polymers and co-polymers of chloroprene.

The following examples, in which all the parts are by weight, illustrate the invention:

*Example 1*

The reaction was carried out in an enamelled kettle provided with a stirrer and a reflux condenser.

The reaction mixture was as follows:

94 parts of phenol.
44 parts of paracetaldehyde.
1 part of concentrated (35%) hydrochloric acid.

With the stirrer operating the acid was dissolved in the phenol at 50° C. and the paracetaldehyde was run in gradually while keeping the temperature substantially constant. The temperature was gradually raised to the boiling point and the reaction mixture was refluxed, keeping the stirrer working, until on pouring a sample into water a dark brown resin separated out. The stirrer was then stopped and the contents of the kettle were allowed to separate into two layers. The resin layer was run into water, well washed and dissolved in industrial alcohol to give a 2% solution.

The resin solution was padded on to a "slipper velvet" fabric of weight about 6 oz./sq. yard and composed of regenerated cellulose continuous filament yarn of tenacity 6 gms. per denier made by saponification of a cellulose acetate yarn that had been stretched in wet steam. The padding was carried out (after scouring the fabric free from oil) in two stages with intermediate batching so as to leave in the fabric about 50% of its weight of the solution. The fabric was dried on a pin-stenter.

A printers' blanket was formed from the impregnated, dried fabric by applying (by spreading) a natural rubber composition containing vulcanising ingredients and vulcanising by heating.

The adhesion between the rubber and the fabric was excellent.

In Examples 2 to 5 the process was carried out as in Example 1 the only difference being in the nature of the fabrics treated which were as follows:

| Example | Fabric |
|---|---|
| 2 | Plain woven cotton; 5 oz./sq. yard. |
| 3 | Satin; cellulose acetate; 5 oz./sq. yard. |
| 4 | Satin; nylon warp, cellulose acetate weft; 6 oz./sq. yard. |
| 5 | Satin; polyacrylonitrile; 7 oz./sq. yard. |

In Examples 3 to 5 the fabrics were composed entirely of continuous filament yarn.

In all these examples the adhesion between rubber and fabric was very good and superior to that obtainable on the same kind of fabric without the resin impregnation.

Examples 6 to 8 below show the improved adhesion obtainable between the layers of fabric-rubber-fabric belting material when the belting is impregnated according to the invention before rubberisation.

In these examples the fabric was a "Fortisan" (registered trade-mark) conveyor-belting duck of weight about 20 oz./sq. yard and composed of continuous filament regenerated cellulose yarn of tenacity 6 gms./denier.

Two layers of the fabric, pre-treated as described above, were bonded to an intermediate layer of a rubber mix in a press during vulcanisation of the rubber at 141° C. for 30 minutes under a pressure of 0.5 ton/sq. inch. The rubber mix had the following composition by weight:

100 parts of crepe rubber pre-masticated for 30 minutes.
1 part of phenyl beta-naphthylamine.
3 parts of sulphur.
1 part of stearic acid.
25 parts of dry zinc oxide.
1.2 parts of benzothiazyl disulphide.

The thickness of rubber between the layers of fabric was about 0.037 inch.

The "stripping force" required to separate the fabric plies was determined on a tensile testing machine, and the mean of maximum and minimum value obtained was recorded in pounds per inch.

| Example | Impregnation | Weight increase due to impregnation | Stripping mean force |
|---|---|---|---|
| 6 | As in Ex. 1 but molar ratio CH₃CHO:phenol equals 6:7. | 0.725 | 35 |
| 7 | As in U. K. Patent No. 477,380. | 8% | 30 |
| 8 | None | None | 20 |

The impregnant of Example 7 was made by mixing rubber latex with an aqueous solution of a resin made by condensing formaldehyde with resorcinol in molar proportion of 2:1 in the presence of a small proportion of caustic soda.

Instead of the cotton fabric of Example 2 a similar fabric of staple-fibre regenerated cellulose made by the viscose process can be used. A satin fabric having both warp and weft of continuous filament nylon, polyethylene terephthalate or poly-4-amino-1.2.4.-triazole can be used in place of the fabric specified in Example 4. In the same way fabrics composed of or containing high tenacity continuous filament yarns of "Vinyon N" (an acetone-soluble co-polymer of acrylonitrile with vinyl chloride) or "Vinyon" (an acetone-soluble co-polymer of vinyl chloride with vinyl acetate) can be treated. The resin impregnation of the invention gives the greatest improvement when at least 80% of the yarns of which the materials treated are composed consist of continuous-filament yarns but substantial improvement is also obtained in materials consisting wholly of staple-fibre yarns or containing such yarns to the extent of more than 20%. For simplicity the making of belting material comprising only two fabric layers with an intervening rubber layer has been described. It will be appreciated, however, that several or many layers of fabric with intermediate layers of rubber can be bonded together according to the thickness required in the composite material.

In all the examples, ethanol can be replaced by methanol or isopropanol.

Having described our invention, what we desire to secure by Letters Patent is:

1. Process for treating fibrous materials the molecules of which comprise repeating units containing carbon, hydrogen, and a more electronegative element than carbon, to facilitate the subsequent formation of strong bonds with rubber during vulcanisation of the rubber, which comprises impregnating the material with a permanently fusible synthetic resin as the sole adhesive, said resin being in solution in an organic liquid that is completely miscible with water, and drying the material, the synthetic resin being a condensation product of acetaldehyde with a phenol, and the said solution being free from any source of formaldehyde.

2. Process according to claim 1, wherein the synthetic resin is water-insoluble but soluble in ethanol, and is applied in solution in a volatile, neutral organic liquid that is completely miscible with water.

3. Process for treating fibrous materials the molecules of which comprise repeating units containing carbon, hydrogen, and a more electronegative element than carbon, to facilitate the subsequent formation of strong bonds with rubber during vulcanisation of the rubber, which comprises impregnating the material with a permanently fusible synthetic resin as the sole adhesive, said resin being in solution in an alcohol selected from the class consisting of methanol, ethanol and isopropanol, and drying the material, the synthetic resin being a condensation product of acetaldehyde with a phenol, and the said solution being free from any source of formaldehyde.

4. Process for treating fibrous materials the molecules of which comprise repeating units containing carbon, hydrogen, and a more electronegative element than carbon, to facilitate the subsequent formation of strong bonds with rubber during vulcanisation of the rubber, which comprises impregnating the material with a permanently fusible synthetic resin as the sole adhesive, said resin being in solution in an alcohol selected from the class consisting of methanol, ethanol and isopropanol, and drying the material, the synthetic resin being a condensation product of acetaldehyde with common phenol, the molar proportions of aldehyde to phenol ranging from 6:7 to 1:1, and the said solution being free from any source of formaldehyde.

5. Process according to claim 4 wherein the material treated comprises yarn of a substance selected from the class consisting of cellulose and regenerated cellulose.

6. Textile material comprising yarn of a substance selected from the class consisting of cellulose and regenerated cellulose, said material being impregnated with 0.5 to 2% of its weight of water-insoluble, alcohol-soluble synthetic resin as the sole adhesive, said resin being a condensation product of acetaldehyde with a phenol in molar proportions of CH₃CHO to phenol ranging from 6:7 to 1:1, said fabric being free from any source of formaldehyde.

7. Textile material comprising yarn of a thermoplastic derivative of cellulose which can be heated to 180° C. without melting or decomposition, said material being impregnated with 0.5 to 2% of its weight of water-insoluble, alcohol-soluble synthetic resin as the sole adhesive, said rein being a condensation product of acetaldehyde with a phenol in molar proportions of CH₃CHO to phenol ranging from 6:7 to 1:1, said fabric being free from any source of formaldehyde.

8. Textile material composed of yarns of which at least 80% are continuous filament yarns of acetone soluble cellulose acetate, said material being impregnated with 0.5 to 2% of its weight of water-insoluble, alcohol-soluble synthetic resin as the sole adhesive, said resin being a condensation product of acetaldehyde with a phenol in molar proportions of CH₃CHO to phenol ranging from 6:7 to 1:1, said fabric being free from any source of additional formaldehyde.

9. Textile material composed of yarns of which at least 80% are continuous filament yarns of regenerated cellulose of tenacity at least 2.5 g./denier, said material being impregnated with 0.5 to 2% of its weight of water-insoluble, alcohol-soluble synthetic resin as the sole adhesive, said resin being a condensation product of acetaldehyde with a phenol in molar proportions of $CH_3CHO$ to phenol ranging from 6:7 to 1:1, said fabric being free from any source of additional formaldehyde.

10. Textile material composed of yarns of which at least 80% are continuous filament yarns of regenerated cellulose of tenacity of at least 6 g./denier, said material being impregnated with 0.5 to 2% of its weight of water-insoluble, alcohol-soluble synthetic resin as the sole adhesive, said resin being a condensation product of acetaldehyde with a phenol in molar proportions of $CH_3CHO$ to phenol ranging from 6:7 to 1:1, said fabric being free from any source of additional formaldehyde.

11. Textile material composed of yarns of which at least 80% are continuous filament yarns of a synthetic linear polymer which can be heated to 180° C. without melting or decomposition, said polymer being selected from the class consisting of polyamides, polyesters and polyaminotriazoles, said material being impregnated with 0.5 to 2% of its weight of water-insoluble, alcohol-soluble synthetic resin as the sole adhesive, said resin being a condensation product of acetaldehyde with a phenol in molar proportions of $CH_3CHO$ to phenol ranging from 6:7 to 1:1, said fabric being free from any source of additional formaldehyde.

12. Textile material composed of yarns of which at least 80% are continuous filament yarns of a synthetic linear polymer which can be heated to 180° C. without melting or decomposition and which is a polymer of acrylonitrile, said material being impregnated with 0.5 to 2% of its weight of water-insoluble, alcohol-soluble synthetic resin as the sole adhesive, said resin being a condensation product of acetaldehyde with a phenol in molar proportions of $CH_3CHO$ to phenol ranging from 6:7 to 1:1, said fabric being free from any source of additional formaldehyde.

13. A woven fabric of suitable construction to provide the textile basis for a rubber-fabric belt, at least 80% of the yarns of said fabric being continuous filament yarns of regenerated cellulose of tenacity at least 6 g./denier, said fabric being impregnated with 0.5 to 2% of its weight of a synthetic resin as the sole adhesive, said resin being a condensation product of acetaldehyde with a phenol in molar proportions of $CH_3CHO$ to phenol ranging from 6:7 to 1:1, said fabric being free from any source of formaldehyde.

14. A rubber-fabric belt in which at 80% of the yarns are continuous filament yarns of regenerated cellulose of tenacity at least 6 g./denier and in which the rubber is bonded to the yarns solely by a synthetic resin with which said yarns are impregnated to the extent of 0.5 to 2% of their weight, said synthetic resin consisting of acetaldehyde and a phenol in molar proportions of 6:7 to 1:1 and said belt being free from any source of formaldehyde.

15. A rubber-fabric sheet suitable for use as a printers' blanket in which at least 80% of the yarns are continuous filament regenerated cellulose yarns of tenacity at least 6 g./denier and in which the rubber is bonded to the yarns solely by a synthetic resin with which said yarns are impregnated to the extent of 0.5 to 2% of their weight, said synthetic resin consisting of acetaldehyde and a phenol in molar proportions of 6:7 to 1:1, and said sheet being free from any source of formaldehyde.

16. Process for treating fibrous materials the molecules of which comprise repeating units containing carbon, hydrogen, and a more electronegative element than carbon, to facilitate the subsequent formation of strong bonds with rubber during vulcanization of the rubber, which comprises impregnating the material with a permanently fusible synthetic resin as the sole adhesive, said resin being in solution in an organic liquid that is completely miscible with water, and drying the material, the synthetic resin being a condensation product of acetaldehyde with a phenol containing a single hydroxy group, and the said solution being free from any source of formaldehyde.

17. Textile material composed of yarns of which at least 80% are continuous filament yarns of regenerated cellulose of tenacity at least 2.5 g./denier, said material being impregnated with 0.5 to 2% of its weight of water-insoluble, alcohol-soluble synthetic resin as the sole adhesive, said resin being a condensation product of acetaldehyde with a phenol containing a single hydroxy group in molar proportions of $CH_3CHO$ to phenol ranging from 6:7 to 1:1, said fabric being free from any source of formaldehyde.

18. A woven fabric of suitable construction to provide the textile basis for a rubber-fabric belt, at least 80% of the yarns of said fabric being continuous filament yarns of regenerated cellulose of tenacity at least 6 g./denier, said fabric being impregnated with 0.5 to 2% of its weight of a synthetic resin as the sole adhesive, said resin being a condensation product of acetaldehyde with a phenol containing a single hydroxy group in molar proportions of $CH_3CHO$ to phenol ranging from 6:7 to 1:1, said fabric being free from any source of formaldehyde.

ALEXANDER HENDERSON GENTLE.
THOMAS JACKSON.

References Cited in the file of this patent

UNITED STATES PATENTS

| Number | Name | Date |
|---|---|---|
| 2,128,229 | Charch et al. | Aug. 30, 1938 |
| 2,291,208 | Brown et al. | July 28, 1942 |
| 2,397,627 | Smith | Apr. 2, 1946 |
| 2,449,180 | Schroeder | Sept. 14, 1948 |
| 2,497,454 | Illingworth et al. | Feb. 14, 1950 |

OTHER REFERENCES

The Chemistry of Commercial Plastics, Wakeman, 1947, pp. 115–125.